(12) United States Patent
Ahn

(10) Patent No.: US 9,172,109 B2
(45) Date of Patent: Oct. 27, 2015

(54) ELECTRODE ASSEMBLY AND SECONDARY BATTERY USING THE SAME

(75) Inventor: Chang-Bum Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 50 days.

(21) Appl. No.: 13/366,120

(22) Filed: Feb. 3, 2012

(65) Prior Publication Data

US 2012/0208055 A1 Aug. 16, 2012

(30) Foreign Application Priority Data

Feb. 11, 2011 (KR) .................. 10-2011-0012378

(51) Int. Cl.
| | |
|---|---|
| *H01M 10/05* | (2010.01) |
| *H01M 10/052* | (2010.01) |
| *H01M 2/26* | (2006.01) |
| *H01M 10/04* | (2006.01) |
| *H01M 10/0587* | (2010.01) |

(52) U.S. Cl.
CPC ............ *H01M 10/052* (2013.01); *H01M 2/263* (2013.01); *H01M 10/0431* (2013.01); *H01M 10/0587* (2013.01); *Y02E 60/122* (2013.01)

(58) Field of Classification Search
None
See application file for complete search history.

(56) References Cited

U.S. PATENT DOCUMENTS

| | | |
|---|---|---|
| 2003/0180605 A1 | 9/2003 | Mizutani |
| 2005/0058908 A1 | 3/2005 | Imachi et al. |
| 2005/0287435 A1* | 12/2005 | Kim .............................. 429/174 |
| 2006/0003221 A1 | 1/2006 | Yeo |
| 2006/0040181 A1* | 2/2006 | Kim et al. ...................... 429/211 |
| 2006/0051662 A1 | 3/2006 | Kwak |
| 2006/0127751 A1 | 6/2006 | Woo |
| 2006/0147793 A1* | 7/2006 | Kim et al. ........................ 429/94 |
| 2006/0269835 A1 | 11/2006 | Song et al. |

(Continued)

FOREIGN PATENT DOCUMENTS

| | | |
|---|---|---|
| CN | 2852406 Y | 12/2006 |
| CN | 1929186 A | 3/2007 |

(Continued)

OTHER PUBLICATIONS

European Search Report dated May 16, 2012 for corresponding EP application No. 12154948.9.

(Continued)

*Primary Examiner* — Ula C Ruddock
*Assistant Examiner* — Scott J Chmielecki
(74) *Attorney, Agent, or Firm* — Knobbe Martens Olson & Bear LLP

(57) ABSTRACT

An electrode assembly includes first and second electrode plates respectively comprising first and second active material portions on which first and second active materials are coated and first and second non-coating portions on which the first and second active materials are not coated; a separator interposed between the first and second electrode plates; and first and second electrode tabs respectively coupled to the first and second non-coating portions. In the electrode assembly, portions of the first and second non-coating portions are opposite to each other but the first and second electrode tabs are not opposite to each other in the electrode plates. The electrode assembly is formed by winding the first and second electrode plates from the portion at which the first and second non-coating portions are opposite to each other. A secondary battery includes the electrode assembly and a case accommodating the electrode assembly therein.

13 Claims, 15 Drawing Sheets

(56) References Cited

U.S. PATENT DOCUMENTS

2009/0317701 A1*  12/2009  Cha et al. .................. 429/94
2010/0015529 A1*  1/2010   Kim et al. .................. 429/246
2011/0183170 A1   7/2011   Kwak

FOREIGN PATENT DOCUMENTS

| | | |
|---|---|---|
| CN | 101271986 A | 9/2008 |
| CN | 101612691 A | 12/2009 |
| EP | 756345 A2 * | 1/1997 |
| EP | 1020943 | 7/2000 |
| EP | 2299522 | 3/2011 |
| JP | 11-265703 | 9/1999 |
| JP | 2003-086171 | 3/2003 |
| JP | 2005-093242 A | 4/2005 |
| JP | 2006-260892 | 9/2006 |
| JP | 2006-324239 A | 11/2006 |
| JP | 2008-117614 | 5/2008 |
| JP | 2009-129553 | 6/2009 |
| KR | 10-2004-0058921 | 7/2004 |
| KR | 10-20090064757 | 6/2009 |
| KR | 10-2011-0087559 | 8/2011 |

OTHER PUBLICATIONS

Office Action issued from the Chinese Patent Office on May 6, 2015 in Chinese Patent Application No. 201210030595.6.

* cited by examiner

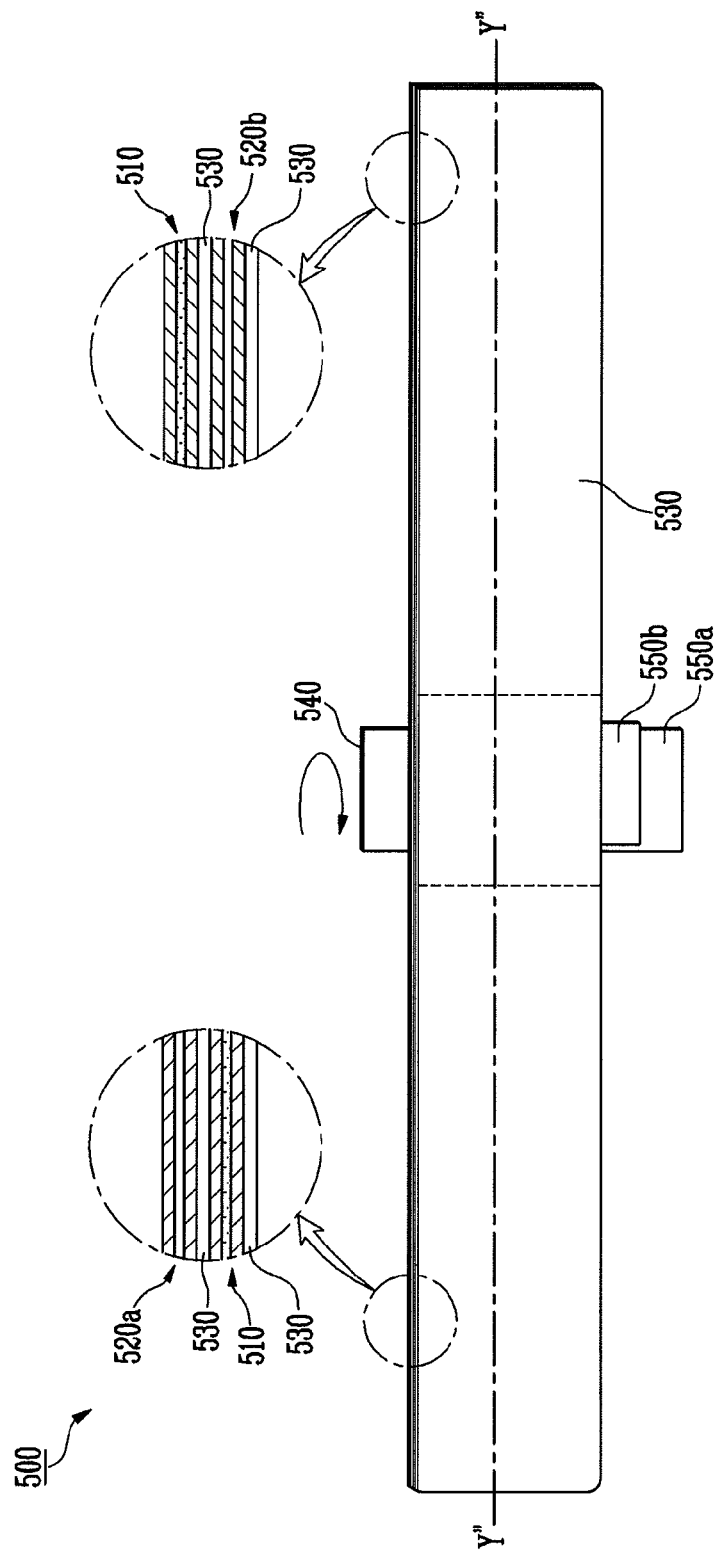

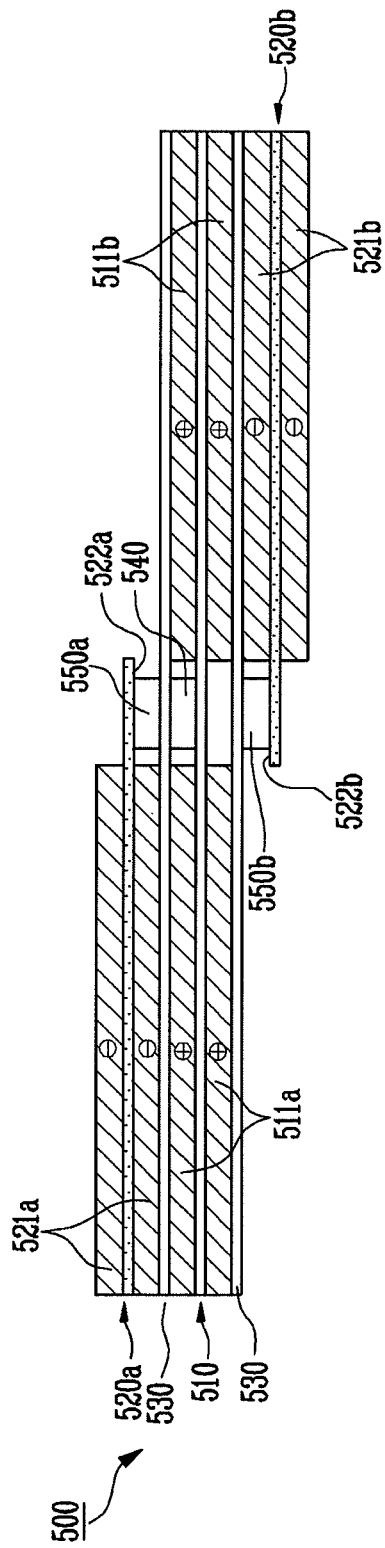

ELECTRODE ASSEMBLY AND SECONDARY BATTERY USING THE SAME

RELATED APPLICATIONS

This application claims priority to and the benefit of Korean Patent Application No. 10-2011-0012378, filed on Feb. 11, 2011, in the Korean Intellectual Property Office, the entire content of which is incorporated herein by reference.

BACKGROUND

1. Field

The present disclosure relates to an electrode assembly for a secondary battery and a secondary battery using the same.

2. Description of the Related Technology

In general, an electrode assembly typically includes a positive electrode plate, a negative electrode plate and a separator interposed therebetween, and a secondary battery is manufactured by accommodating the electrode assembly together with an electrolyte in an outer case.

An electrode assembly formed by winding a positive electrode plate, a negative electrode plate and a separator interposed therebetween may be used in a secondary battery. In a case where the number of windings is increased, the shape of the electrode assembly may be easily changed.

SUMMARY

Embodiments provide an electrode assembly and a secondary battery using the same in which the shape of the electrode assembly is not changed and a winding process is easily performed although the number of windings is increased.

According to an embodiment of the present invention, an electrode assembly including: a first electrode plate comprising a first active material portion on which a first active material is coated and a first non-coating portion on which the first active material is not coated; a second electrode plate comprising a second active material portion on which a second active material is coated and a second non-coating portion on which the second active material is not coated; a separator interposed between the first and second electrode plates; and first and second electrode tabs respectively coupled to the first and second non-coating portions, wherein portions of the first and second non-coating portions are opposite to each other, the first and second electrode tabs do not overlap each other in the electrode plates, and the electrode assembly is formed by winding the first and second electrode plates from the portion at which the first and second non-coating portions face each other.

The first and second electrode tabs may be coupled to upper and lower portions of the electrode assembly, respectively.

A portion at which the first or second electrode tab comes contacts the first or second non-coating portion may be chamfered.

The first or second electrode tab has a width that is identical to the minimum winding width of the electrode assembly.

The first or second electrode tab may be opposite to the first or second non-coating portion, respectively, and the longitudinal length of the portion at which the first or second electrode tab is opposite to the first or second non-coating portion is within the range of about 5 mm to less than about half of the longitudinal length of the first or second electrode plate, respectively.

The first or second non-coating portion may include a cut-away portion formed at a portion of the first or second non-coating portion not coupled to the first or second electrode tab, respectively.

The cut-away portion has a length that is less than the half of the longitudinal length of the first or second electrode plates.

A corner of the cut-away portion may be chamfered.

The cut-away portion may not be included in a bending portion of the electrode assembly to be wound.

The first and second electrode plates may be provided so that portions of the first and second non-coating portions are opposite to each other, and the other ends of the electrode plates may face the opposite directions.

The first electrode plate may include one or more first active material portions on which the first active material is intermittently coated with a first non-coating portion provided between the first active material portions, and the first electrode tab is coupled to the first non-coating portion.

Portions of the first and second non-coating portions may be at one end of the first and second electrode plates, respectively, and may be opposite to each other at a winding central portion of the electrode assembly, wherein a second end of the first and second electrode plates face the opposite directions, and wherein the first and second electrode plates may be wound in the opposite directions with respect to the winding central portion.

A first end of the first and second electrode plates are provided at the winding central portion and a second end of the first and second electrode plates face the same direction, and the first and second electrode plates may be wound in the same direction with respect to the winding central portion.

According to another aspect of the present invention, an electrode assembly comprises: a first electrode plate having one or more first active material portions on which a first active material is intermittently coated and a first non-coating portion on which the first active material is not coated between the first active material portions; two second electrode plates each having a second active material portion on which a second active material is coated and a second non-coating portion on which the second active material is not coated at one end thereof; a separator interposed between the first and second electrode plates; and first and second electrode tabs respectively coupled to the first and second non-coating portions, wherein the second electrode plates are provided so as to be opposite the first electrode plate so that portions of the first and second non-coating portions are opposite to each other and so that the second electrode tabs overlap each other in the electrode plates and so that the first and second electrode tabs do not overlap each other in the electrode plates, and wherein the electrode assembly is formed by winding the first and second electrode plates from a portion at which the first and second non-coating portions are opposite to each other.

The first and second electrode tabs may be respectively coupled to upper and lower portions of the electrode assembly, and the second electrode tabs respectively coupled to the second electrode plates such that they have identical widths and different longitudinal lengths.

A portion at which the first or second electrode tab contacts the first or second non-coating portion may be chamfered.

The first or second electrode tab has a width that is identical to the minimum winding width of the electrode assembly.

The first or second electrode tab may be opposite to the first or second non-coating portion, and the portion at which the first or second electrode tab is opposite to the first or second non-coating portion may have a longitudinal length within the range of about 5 mm to less than about a half of the longitudinal length of the first or second electrode plate.

The first electrode plate may include two first active material portions with a non-coating portion interposed therebetween, and one of the first active material portions of the first electrode plate and the second electrode plate corresponding with the one of the first active material portion may be wound to surround the second electrode plate corresponding with the other of the first active material portions of the first electrode plate.

The first or second non-coating portion may include a cut-away portion formed at a portion of the first or second non-coating portion not coupled to the first or second electrode tab, respectively.

The cut-away portion may have a longitudinal length of about less than half of the longitudinal length of the first or second electrode plates.

A corner of the cut-away portion may be chamfered.

The cut-away portion may not be included in a bending portion of the electrode assembly to be wound.

According to an aspect of the present invention, a secondary battery includes the electrode assembly described above and a case that accommodates the electrode assembly.

As described above, according to embodiments of the present invention, an electrode assembly uses electrode tabs having a width identical to the winding width thereof. Thus, the electrode assembly can be easily wound without a separate winding core.

Also according to an aspect, the electrode assembly includes cut-away portions in non-coating portions. Thus, the central portion of the electrode assembly can be maintained constant in the winding of the electrode assembly, and the thickness of the electrode assembly can be thinner by the cut-away portions.

Also according to an aspect, the electrode assembly includes a positive or negative electrode plate and a plurality of negative or positive electrode plates corresponding to the positive or negative electrode plate. Thus, since the electrode assembly uses a plurality of electrode plates, the design of a secondary battery can be more variously modified.

BRIEF DESCRIPTION OF THE DRAWINGS

The accompanying drawings, together with the specification, illustrate certain embodiments of the present invention, and together with the description, serve to explain principles of the present invention.

FIG. 13A is a top view of the electrode assembly shown in FIG. 12.

FIG. 13B is a sectional view taken along line Y"-Y" of FIG. 13A.

DETAILED DESCRIPTION

Figure 1:
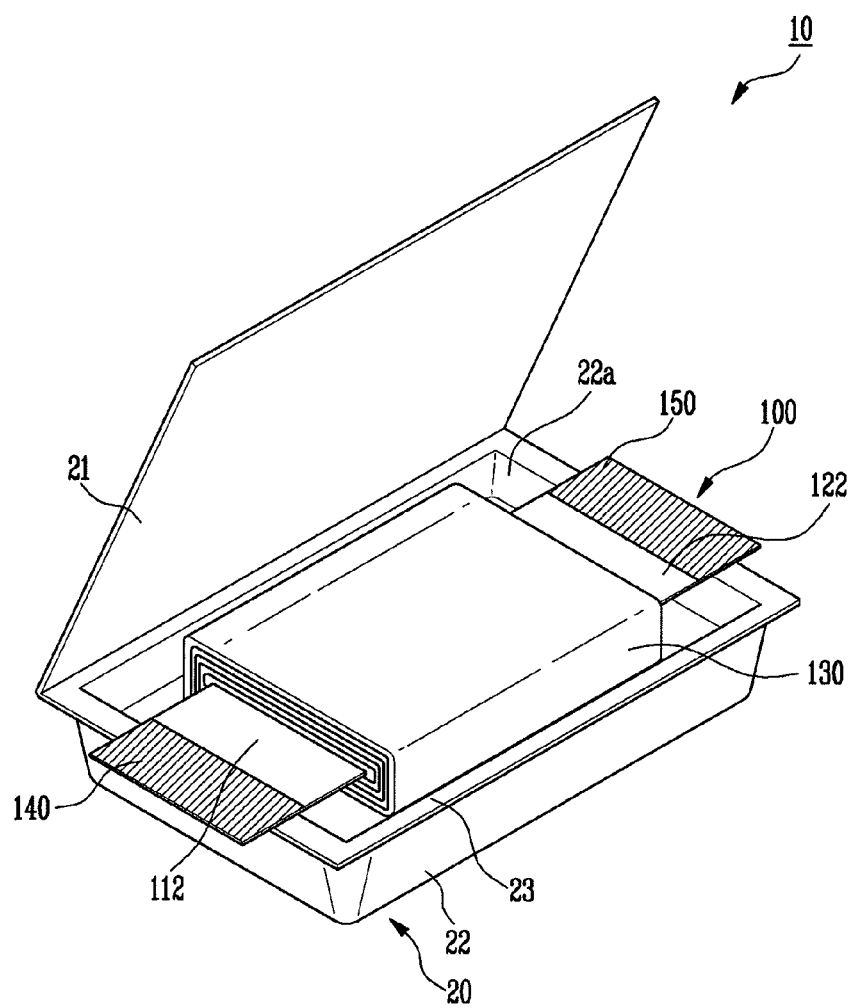
FIG. 1 is a perspective view of a secondary battery having an electrode assembly according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element, or indirectly on the another element with one or more intervening elements interposed therebetween. Also, when an element is referred to as being "connected to" another element, it can be directly connected to the another element, or indirectly connected to another element with one or more intervening elements interposed therebetween. Hereinafter, like reference numerals refer to like elements. In the drawings, the thickness or the size of layers are exaggerated for clarity and not necessarily drawn to scale.

Hereinafter, the configuration and operation of embodiments of the present invention will be described in detail with reference to the accompanying drawings.

FIG. 1 is a perspective view of a secondary battery having an electrode assembly according to an embodiment of the present invention.

Referring to FIG. 1, the secondary battery 10 is a pouch-type secondary battery, and includes a pouch-type case 20 and an electrode assembly 100 accommodated in the pouch-type case 20.

The pouch-type case 20 is provided with a cover 21 and a main body 22. The main body 22 of the pouch-type case 20 is provided with an accommodating portion 22a that is a space in which the electrode assembly 100 is accommodated and a sealing portion 23 formed to be extended outward from an entry side of the accommodating portion 22a. The cover 21 is formed to be integrally connected to one side of the sealing portion 23. The secondary battery 10 is manufactured by accommodating the electrode assembly 100 in the accommodating portion 22a, and then thermally sealing the sealing portion 23 in the state that the main body 22 and the cover 21 are adhered closely to each other.

Although the pouch-type case 20 is shown in FIG. 1, embodiments of the present invention are not limited thereto.

That is, the secondary battery may be manufactured using various cases such as, for example, a can-type case.

Hereinafter, electrode assemblies according to embodiments of the present invention will be described with reference to the accompanying drawings.

Figure 2:
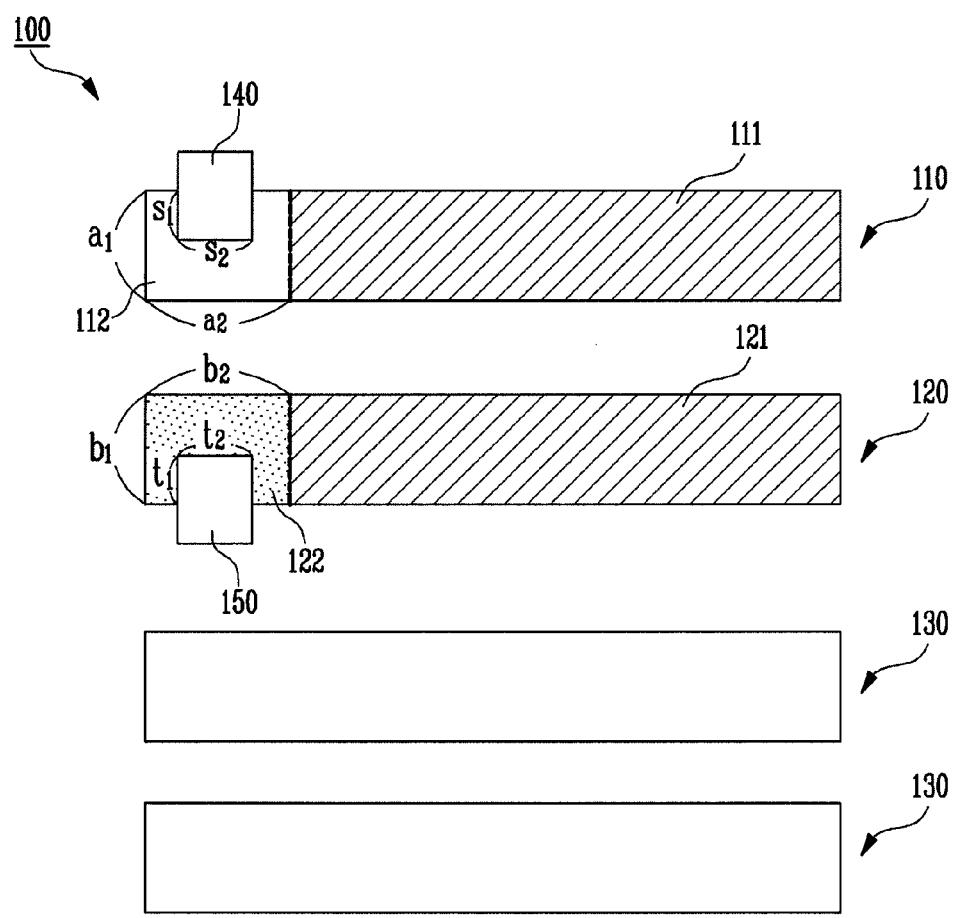
FIG. 2 is an exploded view of an electrode assembly according to an embodiment of the present invention.
Figure 3:
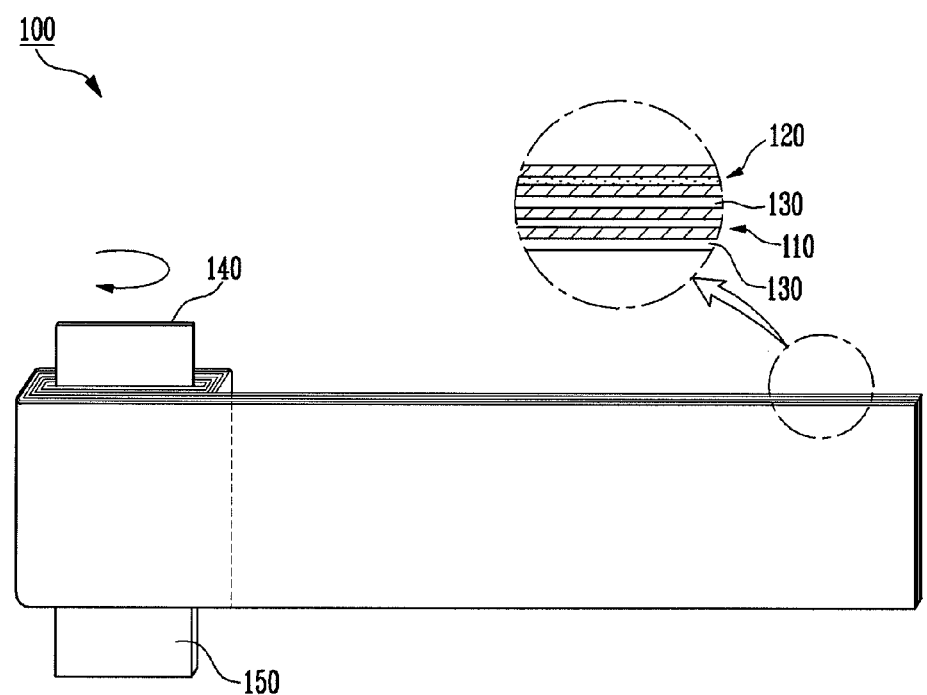
FIG. 3 is a schematic view illustrating a method of winding the electrode assembly shown in FIG. 2.

FIGS. 2 to 4 are views of an electrode assembly according to an embodiment of the present invention.

Figure 4A:
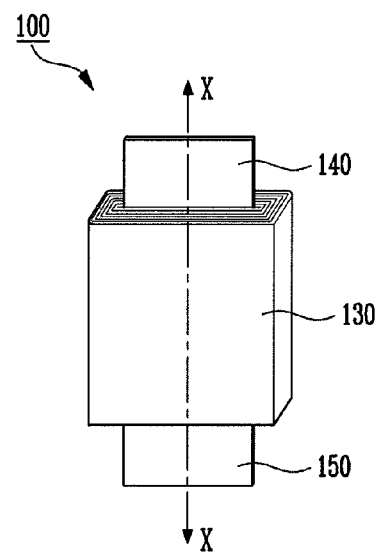
FIG. 4A is a perspective view of the electrode assembly wound according to the method of FIG. 3.
Figure 4B:
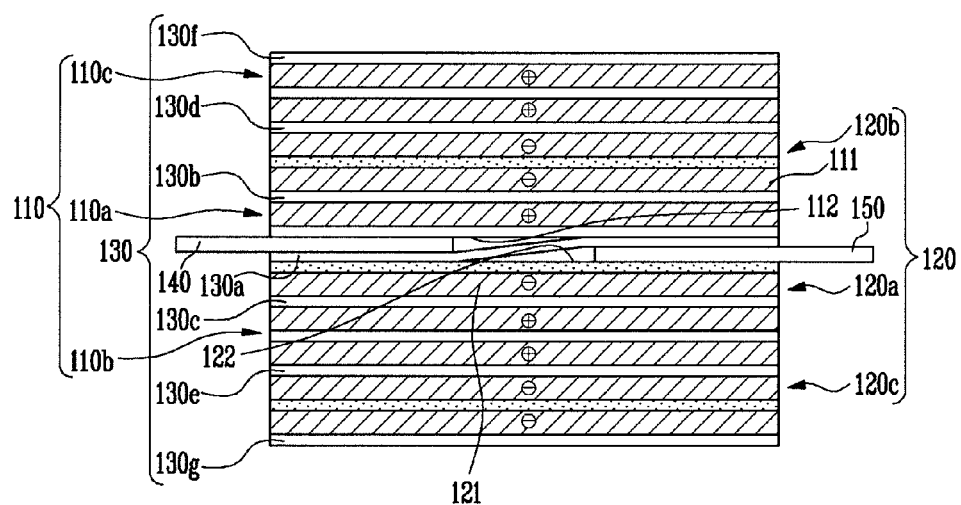
FIG. 4B is a sectional view taken along line X-X of FIG. 4A.

FIG. 2 is an exploded view of an electrode assembly according to an embodiment of the present invention. FIG. 3 is a schematic view illustrating a method of winding the electrode assembly shown in FIG. 2. FIG. 4A is a perspective view of the electrode assembly wound according to the method of FIG. 3. FIG. 4B is a sectional view taken along line X-X of FIG. 4A.

Referring to FIG. 2, the electrode assembly 100 according to the illustrated embodiment includes a first electrode plate 110 having a first active material portion 111 on which a first active material is coated, and a first non-coating portion 112 on which the first active material is not coated; a second electrode 120 having a second active material portion 121 on which a second active material is coated, and a second non-coating portion 122 on which the second active material is not coated; separators 130 interposed between the first and second electrode plates 110 and 120; and first and second electrode tabs 140 and 150 respectively provided to the first and second non-coating portions 112 and 122. The first and second electrode plates 110 and 120 may be provided so that at least portions of the first and second non-coating portions 112 and 122 are opposite to each other so as to face each other with the separator 130 interposed but the first and second electrode tabs 140 and 150 are not opposite to each other in the electrode plates. The electrode tabs 140 and 150 may overlap each other with the separator 130 interposed therebetween. The electrode assembly 100 may be formed by winding the first and second electrode plates 110 and 120 from a portion at which the first and second non-coating portions 112 and 122 are opposite to each other.

The first electrode plate 110 is a positive electrode plate, and the positive electrode plate can include a positive electrode active material portion 111 having a positive electrode active material coated on a single surface or both surfaces of a positive electrode collector, and a first non-coating portion 112 on which the positive electrode active material is not coated. The positive electrode collector can generally be a material having high conductivity. The material is not particularly limited but preferably is one that does not cause a chemical change. For example, the positive electrode collector may include aluminum, nickel, titanium, plastic carbon and the like.

The positive electrode active material portion 111 may include a positive electrode active material that is a layered compound containing lithium, a conducting material for improving conductivity, and a binder for improving the binding force between the layered compound and the conducting material.

The first non-coating portion 112 is a portion on which the positive electrode active material is not coated, and the first electrode tab 140 is attached to the first non-coating portion 112. The first electrode tab 140 may be formed of nickel or the like, and may be attached to the first non-coating portion 112 using at least one of ultrasonic welding, resistance welding and laser welding.

The second electrode plate 120 is a negative electrode plate, and the negative electrode plate may include a negative electrode active material portion 121 having a negative electrode active material coated on a single surface or both surfaces of a negative electrode collector and a second non-coating portion 122 on which the negative electrode active material is not coated. The negative electrode collector is generally a conductive metal plate, and may be formed of, for example, copper, stainless steel, aluminum, nickel or the like.

The negative electrode active material portion 121 may be formed by mixing a negative electrode active material and a binder for improving the binding force of the negative electrode active material with a solvent so as to form a slurry, and then coating the slurry on the negative electrode collector.

The separator 130 may be interposed between the first and second electrode plates 110 and 120, and may be formed in the shape of an extended sheet. The separator 130 may serve as a path along which ions move, and may function to prevent the positive and negative electrode plates 110 and 120 from coming into contact with each other. Therefore, the separator 130 may be an insulating thin film having high ion transmittance and mechanical strength.

Electrode assemblies used in secondary batteries may be classified into a winding-type electrode assembly, a stacking-type electrode assembly and the like. The winding-type electrode assembly may be formed by winding sheet-shaped positive and negative electrode plates extended lengthwise and a separator interposed between these electrode plates. On the other hand, the stacking-type electrode assembly may be formed by sequentially stacking a plurality of positive and negative electrode plates with a certain size while interposing separators between the respective electrode plates. In the winding-type electrode assembly, one of the easiest methods for increasing the capacity of a battery is to increase the number of windings. However, as the number of windings is increased, the electrode plates and separator that constitute the electrode assembly may be easily separated, and the shape of the electrode assembly may be changed. Furthermore, a short circuit or the like may occur through direct contact between the positive and negative electrode plates.

Meanwhile, the electrode assembly 100 according to the present embodiment may be formed by winding, in one direction, the positive and negative electrode plates 110 and 120 opposite to each other and the separator 130 interposed between these electrode plates.

The first and second electrode tabs 140 and 150 may be provided so that the width of each of the electrode tabs is identical to the minimum winding width of the electrode assembly 100. In the electrode assembly 100, the first and second electrode tabs 140 and 150 may be provided to the upper and lower portions of the electrode assembly 100, respectively.

When the electrode assembly 100 is wound, the first and second electrode tabs 140 and 150 may serve as winding cores that become a reference width for the winding width of the electrode assembly 100. Thus, the first and second electrode tabs 140 and 150 can facilitate the winding of the electrode assembly 100 and prevent the shape of the electrode assembly 100 from being changed. Accordingly, since limitations by process failures with respect to the increase of the number of windings are inhibited, it is advantageous to manufacture large capacity batteries and the like.

Referring to FIGS. 2 and 3, the portions of the first and second non-coating portions 112 and 122 at which the first and second electrode tabs 140 and 150 are respectively attached to with respect to the winding direction will be referred to as attachment surfaces. The width $s_2$ or $t_2$ of the first and second electrode tabs 140 and 150, respectively, attached to the attachment surfaces may be identical or similar to the winding width of the electrode assembly 100 according to the illustrated embodiment. Preferably, the width $s_2$ or $t_2$ of the first and second electrode tabs 140 and 150 is identical to the winding width of the electrode assembly 100.

In FIG. 2, the longitudinal length $s_1$ of the attachment surface of the first electrode tab 140 attached to the first non-coating portion 112 may be determined by the minor-axis length $a_1$ of the first electrode plate 110, and the width $s_2$ of the first electrode tab 140 may be determined by the winding width of the electrode assembly 100. The longitudinal length $t_1$ of the attachment surface of the second electrode tab 150 attached to the second non-coating portion 122 may be determined by the minor-axis length $b_1$ of the second electrode plate 120, and the width $t_2$ of the second electrode tab 150 may be determined by the winding width of the electrode assembly 100.

Although it has been illustrated in FIG. 2 that the sizes of the attachment surfaces of the first and second electrode tabs 140 and 150 respectively attached to the first and second non-coating portions 112 and 122 are identical to each other, embodiments of the present invention are not limited thereto. Also, the sizes of the first and second electrode tabs 140 and 150 may be different from each other. However, the sizes of the first and second electrode tabs 140 and 150 are preferably identical to each other in consideration of productivity, processing efficiency and the like.

The sum ($s_1$+$t_1$) of the longitudinal length $s_1$ of the attachment surface of the first electrode tab 140 and the longitudinal length $t_1$ of the attachment surface of the second electrode tab 150 may be determined by the minor-axis lengths a1 and b1 of the first and second electrode plates 110 and 120. Specifically, the sum ($s_1$+$t_1$) of the longitudinal lengths of the attachment surfaces may be less than the minor-axis length of one, which may be shorter than that of the other, between the minor-axis length $a_1$ of the first electrode plate 110 and the minor-axis length $b_1$ of the second electrode plate 120. Hereinafter, the details will be specifically described.

In the embodiment illustrated in FIG. 2, the first or second electrode tab 140 or 150 is opposite to or overlaps the first or second non-coating portion 112 or 122, and the longitudinal length of the facing portion may be within the range of about 5 mm or longer to less than half of the longitudinal length of the first or second electrode plate 110 or 120. That is, in a case where the minor-axis lengths of the positive and negative electrode plates 110 and 120 are identical to each other, the longitudinal length $s_1$ of the attachment surface of the first electrode tab 140 with respect to the winding direction may be within the range of 5 mm or longer to less than ½ of the minor-axis length $a_1$ or $b_1$ of the first or second electrode plates 110 or 120.

In a case where the longitudinal length $s_1$ of the attachment surface of the first electrode tab 140 is less than about 5 mm, the attachment surface at which the first electrode tab 140 is attached to the first non-coating portion 112 is not sufficient, and therefore, the first electrode tab 140 may be easily separated from the first non-coating portion 112 by an external force. In a case where the longitudinal length $s_1$ of the attachment surface of the first electrode tab 140 is more than about ½ the length of the minor-axis length $a_1$ or $b_1$ of the first or second electrode plates 110 or 120, portions of the first and second electrode tabs 140 and 150 may be opposite to each other with the separator 130 interposed therebetween. This may increase the thickness of the electrode assembly 100 and cause failure in the shape of the electrode assembly 100 because the electrode assembly 100 lost its balance in its winding. The details described above may be the same for the second electrode tab 150.

The widths $s_2$ and $t_2$ of the first and second electrode tabs 140 and 150 may be determined by the width of the electrode assembly 100 according to the illustrated embodiment. When the electrode assembly 100 is wound, the first and second electrode tabs 140 and 150 serve as winding cores. Thus, the winding width of the electrode assembly 100 can be maintained constant, and accordingly, the winding process of the electrode assembly 100 can be easily performed.

In this instance, the widths $s_2$ and $t_2$ of the first and second electrode tabs 140 and 150 may be identical to or different from each other. In a case where the widths $s_2$ and $t_2$ of the first and second electrode tabs 140 and 150 are different from each other, the winding width of the electrode assembly 100 may be determined by the width of one electrode tab, which may be greater than that of the other, between the first and second electrode tabs 140 and 150. Therefore, since only one electrode tab having the wider width can serve as a winding core, force is not biased to one direction in the winding of the electrode assembly 100. In a case where the widths $s_2$ and $t_2$ of the first and second electrode tabs 140 and 150 are identical to each other, both the first and second electrode tabs 140 and 150 can serve as winding cores, and thus the winding of the electrode assembly 100 can be more easily performed. Further, since it is unnecessary to individually manufacture and manage the electrode tabs, production costs can be reduced. Thus, the widths $s_2$ and $t_2$ of the first and second electrode tabs 140 and 150 are preferably identical to each other.

FIG. 3 shows an embodiment of an electrode assembly 100 in which the positive and negative electrode plates 110 and 120 are opposite to each other with the separator 130 interposed therebetween. In order to maximize the capacity of the secondary battery in the illustrated embodiment, the active material portions of the electrode plates are opposite to each other, and the non-coating portions of the electrode plates are opposite to each other. Thus, the first non-coating portion 112 is opposite to the second non-coating portion 122 with the separator 130 interposed therebetween.

FIG. 4A is a perspective view of the electrode assembly 100 according to this embodiment, and FIG. 4B is a sectional view taken along line X-X of FIG. 4A.

Referring to FIGS. 4A and 4B, positive electrode plates 110a, 110b and 110c and negative electrode plates 120a, 120b, 120c and 120d may be alternately provided with separators 130a, 130b, 130c, 130d, 130e and 130f interposed therebetween. The positive and negative electrode plates 110a and 120a may be opposite to each other with the separator 130a interposed therebetween at a central portion of the electrode assembly 100. The central portion is a portion at which the winding of the electrode assembly 100 is started, and non-coating portions of the electrode plates may be opposite to each other at the central portion. That is, the first and second electrode tabs 140 and 150 may be provided with the separator 130a interposed therebetween at the central portion of the electrode assembly 100. Preferably, the first and second electrode tabs 140 and 150 are not directly opposite to each other on the same side of the electrode assembly but can overlap each other.

Problems can occur when the first and second electrode tabs 140 and 150 are opposite to each other on the same side of the electrode assembly. In a case where the entire attachment surfaces of the electrode tabs are opposite to each other the same side of the electrode assembly, the thickness of the electrode assembly 100 may increase. In a case where portions of the attachment surfaces of the electrode tabs are opposite to each other the same side of the electrode assembly, the thickness of the electrode assembly 100 may increase, and the central portion of the electrode assembly 100 may be unequal. Therefore, deformation of the electrode assembly 100 may be caused by the winding of the electrode assembly 100.

The portion at which the first or second electrode tab 140 or 150 contacts the first or second non-coating portion 112 or 122 may be chamfered. Since the separator 130 may be a thin film, it may be damaged by sharp corners of the electrode tabs 140 and 150. Thus, the corner of the first or second electrode tab 140 or 150, particularly the portion at which the first or second electrode 140 or 150 contacts the first or second non-coating portion 112 or 122, is chamfered, thereby preventing damage of the separator 130.

The positive electrode plate may include one or more first active material portions having the active material intermittently coated thereon, and a first non-coating portion provided between the first active material portions. In this instance, the first non-coating portion may be provided with the first electrode tab.

Hereinafter, an electrode assembly according to another embodiment of the present invention will be described. In the following description, configurations and functions identical to those described in FIGS. 1 to 4B will not be described.

Figure 5:
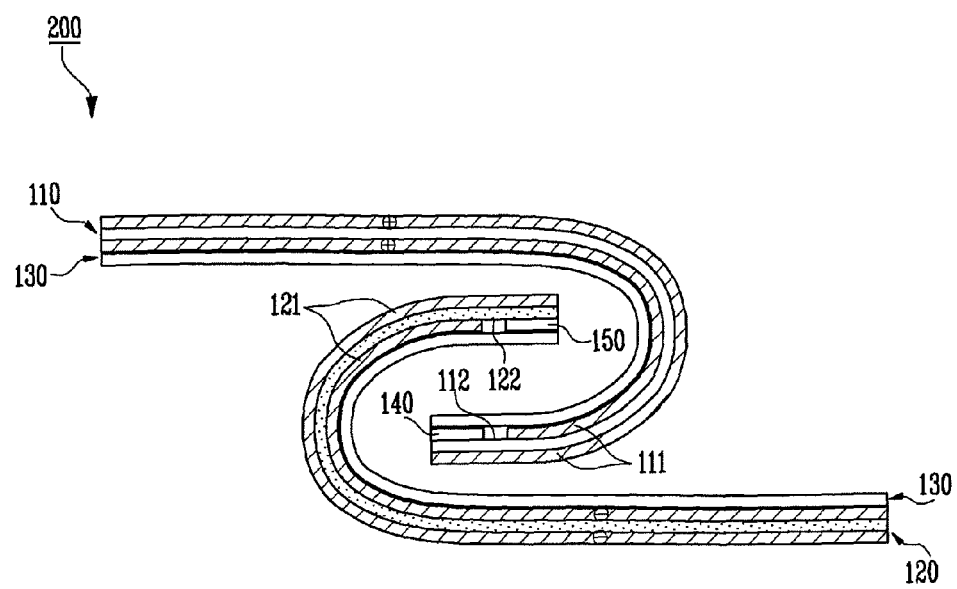
FIG. 5 is a top view illustrating a method of winding an electrode assembly according to another embodiment of the present invention.
Figure 6A:
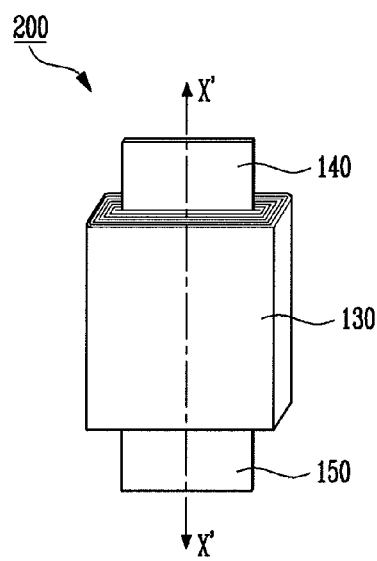
FIG. 6A is a perspective view of the electrode assembly wound according to the method of FIG. 5.
Figure 6B:
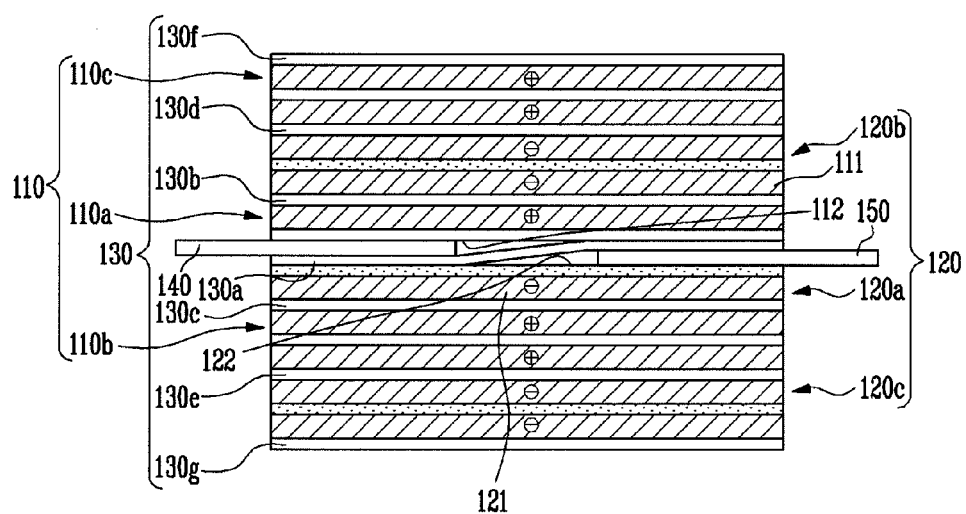
FIG. 6B is a sectional view taken along line X'-X' of FIG. 6A.

FIGS. 5 to 6B are views of an electrode assembly according to another embodiment of the present invention.

FIG. 5 is a top view illustrating a method of winding the electrode assembly according to another embodiment of the present invention. FIG. 6A is a perspective view of the electrode assembly wound according to the method of FIG. 5. FIG. 6B is a sectional view taken along line X'-X' of FIG. 6A.

Referring to FIGS. 2 and 5, in the electrode assembly 200 according to this embodiment, the positive and negative electrode plates 110 and 120 may be provided so that at least portions of the first and second non-coating portions 112 and 122 are opposite to each other and the other ends of the positive and negative electrode plates 110 and 120 face the opposite directions. The positive and negative electrode plates 110 and 120 are wound in the opposite directions with respect to a winding central portion of the electrode assembly 200.

The positive electrode plate 110 may be disposed so that the first non-coating portion 112 faces the left side thereof, and the negative electrode plate 120 may be disposed so that the second non-coating portion 122 faces the right side thereof. Subsequently, the electrode plates 110 and 120 may be provided so that the non-coating portions having the first and second electrode tabs 140 and 150 respectively attached thereto are opposite each other in the state that the electrode plates 110 and 120 are provided with the separators 130, respectively. In this instance, the first and second electrode tabs 140 and 150 are stacked so that they are not opposite to each other. Thus, the first and second electrode tabs 140 and 150 may be respectively provided at upper and lower portions of the electrode assembly 200 (see FIGS. 6A and 6B), so that they are stacked to be spaced apart from each other.

Subsequently, as shown in FIG. 5, the positive electrode plate 110 provided with the separator 130 may be wound counterclockwise to surround the negative electrode plate 120 provided with the separator 130. The negative electrode plate 120 may also be wound counterclockwise to surround the positive electrode plate 110. By repeatedly doing this, the wound electrode assembly 200 according to the present embodiment is manufactured. The electrode assembly 200 may be wound with respect to the non-coating portions.

The first and second electrode tabs 140 and 150 may be provided to a central portion of the electrode assembly 200. In the winding of the electrode assembly 200, the first and second electrode tabs 140 and 150 can serve as winding cores, so that the winding width of the electrode assembly 200 can be maintained constant.

Referring to FIGS. 6A and 6B, the electrode assembly 200 according to an embodiment and the electrode assembly 100 shown in FIG. 3 may be manufacturing using different winding methods. However, the completed electrode assemblies can have the same shape.

Figure 7:
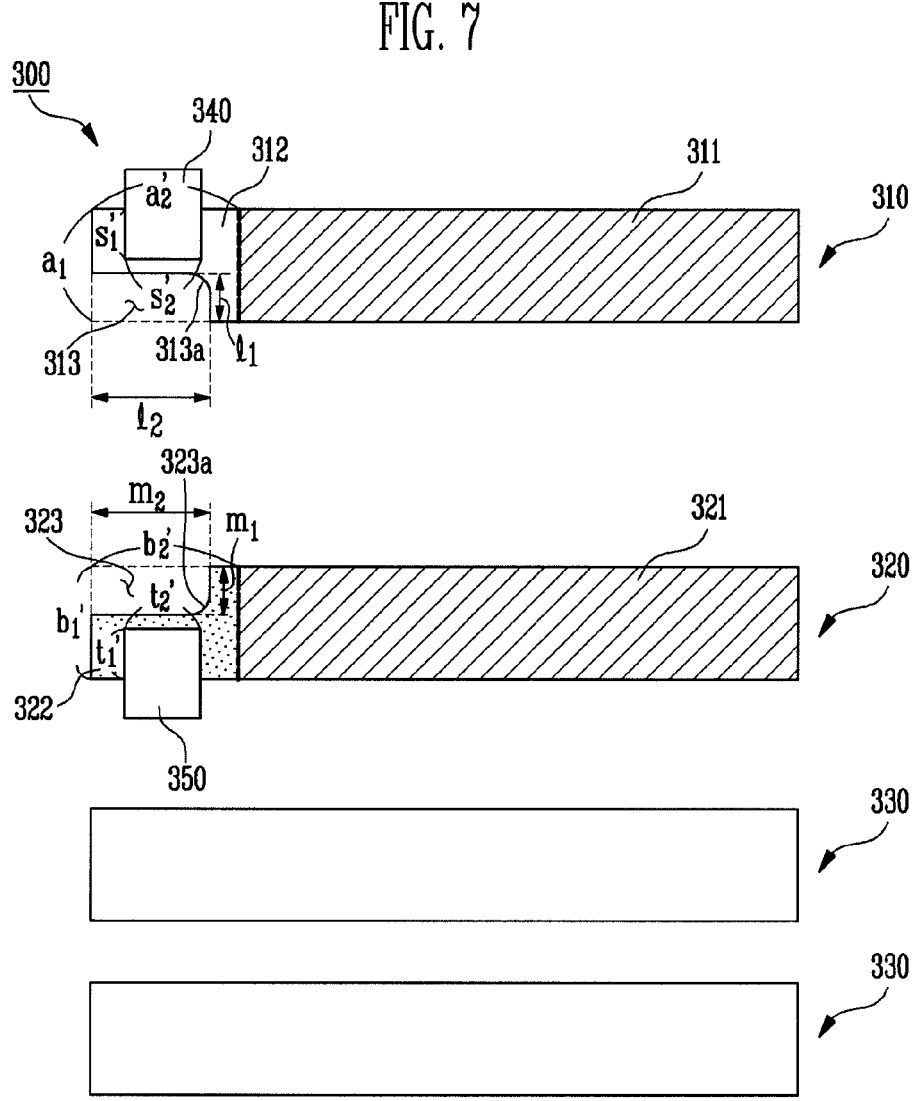
FIG. 7 is an exploded view of an electrode assembly according to still another embodiment of the present invention.

FIGS. 7 to 9 are views of an electrode assembly according to still another embodiment of the present invention.

Figure 8A:
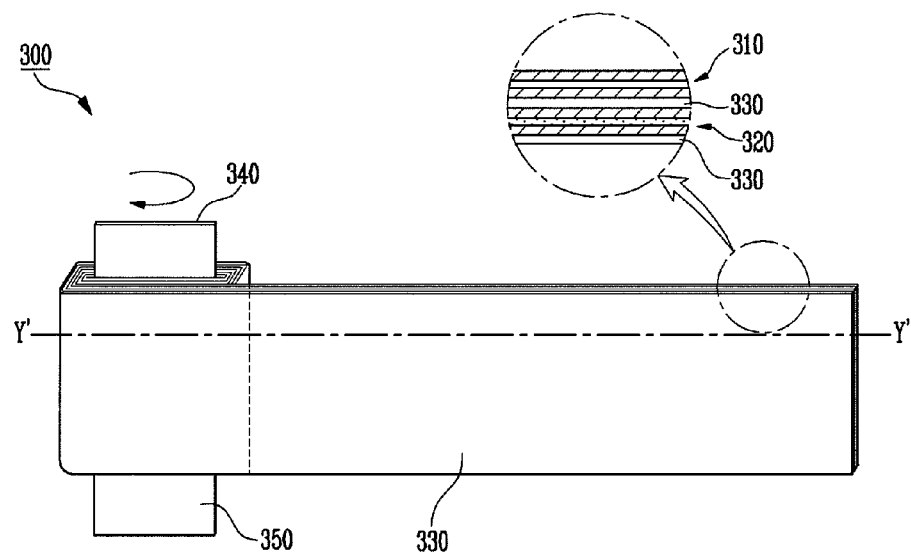
FIG. 8A is a schematic view illustrating a method of winding the electrode assembly shown in FIG. 7.
Figure 8B:
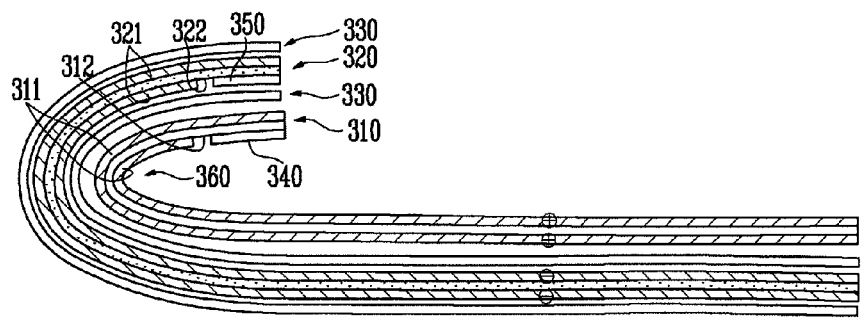
FIG. 8B is a top view illustrating the method of winding the electrode assembly shown in FIG. 7.
Figure 9A:
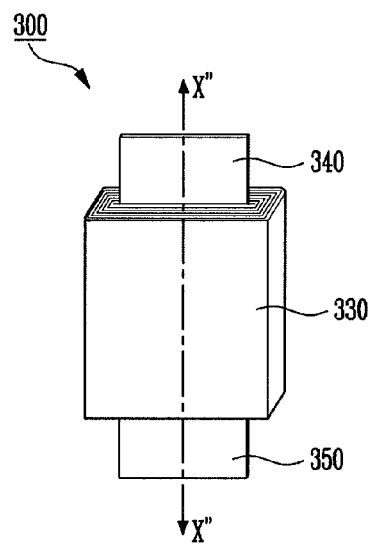
FIG. 9A is a perspective view of the electrode assembly wound according to the method of FIGS. 8A and 8B.
Figure 9B:
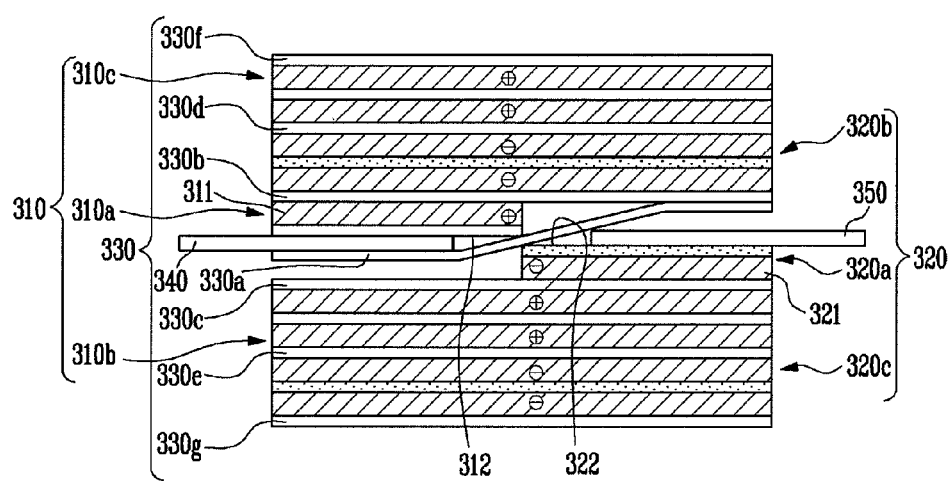
FIG. 9B is a sectional view taken along line X"-X" of FIG. 8A.

FIG. 7 is an exploded view of an electrode assembly according to an embodiment of the present invention. FIG. 8A is a schematic view illustrating a method of winding the electrode assembly shown in FIG. 7. FIG. 8B is a top view illustrating the method of winding the electrode assembly shown in FIG. 7. FIG. 9A is a perspective view of the electrode assembly wound according to the method of FIGS. 8A and 8B. FIG. 9B is a sectional view taken along line X"-X" of FIG. 8A.

Referring to FIGS. 7 and 8, in the electrode assembly 300 according to the present embodiment, a first or second non-coating portion 312 or 323 may include a portion 313 or 323 obtained by cutting away a portion at which a first or second electrode tab 340 or 350 is not provided.

The cut-away portion 313 provided to the first non-coating portion 312 may be formed downward from an attachment surface of the first electrode tab 340. The cut-away portion 323 provided to the second non-coating portion 322 may also be formed downward from an attachment surface of the second electrode tab 350. Therefore, in a case where positive and negative electrode plates 310 and 320 are provided opposite to each other with a separator 330 interposed therebetween in the electrode assembly 300, the cut-away portions 313 and 323 may be positioned to correspond to the first and second electrode tabs 340 and 350, respectively.

Specifically, in the illustrated embodiment, the cut-away portion 313 of the first non-coating portion 312 is opposite to the second electrode tab 350 at the side of the second non-coating portion 322, and the cut-away portion 323 of the second non-coating portion 322 is opposite to the first electrode tab 340 at the side of the first non-coating portion 312. That is, the first electrode tab 340 formed at the side of the first non-coating portion 312 is not opposite to the second non-coating portion 322 of the negative electrode plate 320. Similarly, the second electrode tab 350 formed at the side of the second non-coating portion 322 is not opposite to the first non-coating portion 312 of the positive electrode plate 310. As described above, the first and second electrode tabs 340 and 350 contact only the first and second non-coating portions 312 and 322, respectively, to which the first and second electrode tabs 340 and 350 are attached, by the cut-away portions 313 and 323 at a central portion of the electrode assembly 300. Accordingly, the thickness of the central portion of the electrode assembly 300 according to this embodiment can be thinner.

The cut-away portion 313 may be provided so that a corner 313a of the cut-away portion 313 is chamfered. In a case where the corner 313a of the cut-away portion 313 is a sharp corner, stress may be easily concentrated on a vertex of the corner 313a. Therefore, the electrode plates may be frequently torn with respect to the vertex. Accordingly, as shown in FIG. 7, the cut-away portion 313 is preferably provided so that the corner 313a of the cut-away portion 313 is chamfered.

In the positive electrode plate 310, the longitudinal length $s'_1$ of the attachment surface of the first electrode tab 340 attached to the first non-coating portion 312 may be determined by the minor-axis length $a'_1$ of the positive electrode plate 310. The width $s'_2$ of the first electrode tab 340 may be determined by the winding width of the electrode assembly 300 according to the present embodiment. Similarly, in the negative electrode plate 320, the longitudinal length $t'_1$ of the attachment surface of the second electrode tab 350 attached to the second non-coating portion 322 may be determined by the minor-axis length $b'_1$ of the negative electrode plate 320. The width $t'_2$ of the second electrode tab 350 may be determined by the winding width of the electrode assembly 300 according to this embodiment.

In the longitudinal length $s'_1$ of the attachment surface of the first electrode tab 340 and the longitudinal length $t'_1$ of the attachment surface of the second electrode tab 350, the sum $(s'_1+t'_1)$ of the longitudinal lengths of the attachment surfaces may be less than the minor-axis length of one, which may be shorter than that of the other, between the minor-axis length $a_1$ of the first electrode plate 310 and the minor-axis length $b_1$ of the second electrode plate 320. In a case where the longitudinal lengths $s'_1$ and $t'_1$ of the attachment surfaces are identical to each other as shown in FIG. 7, the longitudinal length $s'_1$ or $t'_1$ of each of the attachment surfaces may be within the range of 5 mm or longer to less than a half of the longitudinal length of the first or second electrode plate 310 or 320.

Hereinafter, the method of winding the electrode assembly 300 according to the present embodiment will be described in detail with reference to FIGS. 8A to 9B.

First, the electrode assembly 300 according to this embodiment is wound as shown in FIGS. 8A and 8B. Referring to FIGS. 8A and 8B, in the electrode assembly 300, the positive and negative electrode plates 310 and 320 are opposite to each other with the separator 330 interposed therebetween. The first and second electrode tabs 340 and 350 may serve as winding cores of the electrode assembly 300 so as to facilitate the winding of the electrode assembly 300. In this instance, the first and second electrode tabs 340 and 350 may be protruded in the opposite directions with the separator 300 interposed therebetween.

In the electrode assembly 300, one end of the positive and negative electrode plates 310 and 320 may be provided at the central portion of winding, and the other ends of the positive and negative electrode plates 310 and 320 face the same direction. Thus, the positive and negative electrode plates 310 and 320 can be wound in the same direction with respect to the central portion of winding.

Referring to FIG. 9B, positive electrode plates 310a, 310b and 310c and negative electrode plates 320a, 320b, 320c and 320d have separators 330a, 330b, 330c, 330d, 330e and 330f respectively interposed therebetween. In this embodiment, the first and second non-coating portions 312 and 322 are opposite to each other at the central portion of the electrode assembly 300. In this case, as shown in FIG. 8A, the first and second electrode tabs 340 and 350 are not opposite to each other but preferably spaced apart from each other.

The first and second non-coating portions 312 and 322 do not directly contribute to the capacity of the secondary battery. Thus, the cut-away portions 313 and 323 may be provided to the respective first and second non-coating portions 312 and 322, so that it is possible to decrease the thickness of the electrode assembly 300. The cut-away portion 313 or 323 may be provided to have a longitudinal length less than about a half of the longitudinal length of the positive or negative electrode plate 310 or 320.

In the cut-away portion 313 of the first non-coating portion 312, the longitudinal length $l_1$ of the cut-away portion 313 may be determined by the longitudinal length $s'_1$ of the attachment surface of the first electrode tab 340 and the minor-axis length $a'_1$ of the first electrode plate 310. The width $l_2$ of the cut-away portion 313 may be determined by the width $s'_2$ of the first electrode tab 340 and the winding width of the electrode assembly 300 according to this embodiment. The cut-away portion 323 provided to the second non-coating portion 322 may also be the same as described above.

If the cut-away portions 313 and 323 are formed in the attachment surfaces of the electrode tabs, respectively, the attachment force between the non-coating portions and the electrode tabs may be decreased. Therefore, the cut-away portions 313 and 323 are preferably formed at portions of the non-coating portions, at which the electrode tabs are not provided, respectively. The longitudinal length $l_1$ of the cut-away portion 313 with respect to the winding direction may be within the range from 0 mm to less than the value obtained by subtracting the minimum longitudinal length $s'_1$ (5 mm) of the attachment surface of the first electrode tab 340 from the minor-axis length $a'_1$ of the first electrode plate 310. Preferably, the longitudinal length $l_1$ of the cut-away portion 313 with respect to the winding direction may be less than a half of the minor-axis length $a'_1$ of the first electrode plate 310. In a case where the width $l_2$ of the cut-away portion 313 is different from the width $s'_2$ of the first electrode tab 340, the thickness of the central portion of the electrode assembly 300 is not constant. Therefore, the width $l_2$ of the cut-away portion 313 is preferably identical to the width $s'_2$ of the first electrode tab 340. The details described above can be identically applied to the longitudinal length $m_1$ and width $m_2$ of the cut-away portion 323 of the second non-coating portion 322.

Although it has been illustrated in FIG. 7 that in the first and second electrode tabs 340 and 350, the longitudinal lengths $s'_1$ and $t'_1$ and widths $s'_2$ and $t'_2$ of the attachment surfaces of the electrode tabs and the longitudinal lengths $l_1$ and $m_1$ and width $l_2$ and $m_2$ of the cut-away portions are identical to each other, embodiments of the present invention are not limited thereto.

A bending portion is a portion at which the electrode plates and the separators are bent like a bow in the winding of the electrode assembly 300. The cut-away portions 313 and 323 may not be included in the bending portion of the electrode assembly 300.

Referring to FIGS. 9A and 9B, the first and second non-coating portions 312 and 322 may be positioned at the central portion of the electrode assembly 300. The cut-away portions may be formed in the first and second non-coating portions 312 and 322, respectively. In the non-coating portions 312 and 322 respectively provided with the cut-away portions, problems can occur when the cut-away portions are included in the bending portion 360 at the central portion of the electrode assembly 300. The non-coating portion provided with the cut-away portion can have tear damage relatively weaker than that provided with no cut-away portion. Therefore, if a force is applied to the cut-away portion, a portion of or the entire non-coating portion may be torn. Further, since the cut-away portion is weak to external forces, it can interrupt the constant maintaining of the central portion in the winding of the electrode assembly. As shown in FIG. 9, the electrode assembly 300 according to this embodiment is wound so that the cut-away portions are included in the bending portion that is a portion bent like a bow. Preferably, portions of active material portions are included in the bending portion.

Figure 10:
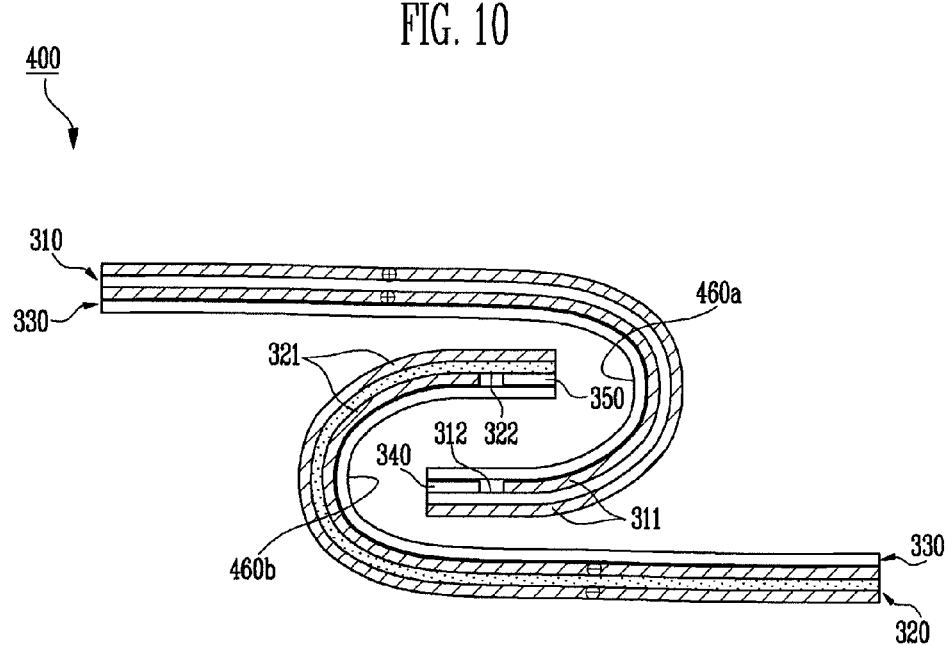
FIG. 10 is a top view illustrating a method of winding an electrode assembly according to still another embodiment of the present invention.
Figure 11:
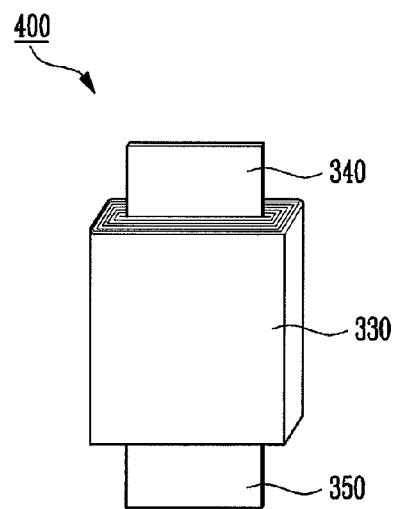
FIG. 11 is a perspective view of the electrode assembly wound according to the method of FIG. 10.

FIGS. 10 and 11 are views of an electrode assembly according to still another embodiment of the present invention.

FIG. 10 is a top view illustrating a method of winding an electrode assembly according to another embodiment of the present invention. FIG. 11 is a perspective view of the electrode assembly wound according to the method of FIG. 10.

The electrode assembly 400 according to this embodiment uses the first and second electrode plates 310 and 320, the separators 330 and the first and second electrode tabs 340 and 350, as shown in FIG. 7. The configuration and operation of the electrode assembly 400 that are identical to those of the electrode assembly 300 shown in FIG. 7 will not be described.

Referring to FIG. 10, in the electrode assembly 400 according to this embodiment, the separators 330 are first provided to the respective positive and negative electrode plates 310 and 320 so that the electrode plates are not directly opposite to each other. Subsequently, the positive and negative electrode plates 310 and 320 may be stacked so that the first non-coating portion 312 faces the left side of the positive electrode plate 310 and the second con-coating portion 322 faces the right side of the negative electrode plate 320. In this instance, at least portions of the first and second non-coating portions 312 and 322 are opposite to each other, and the active material portions of the first and second non-coating portions 312 and 322 face the opposite directions.

The first and second electrode tabs 340 and 350 provided at the central portion of the electrode assembly 400 may serve as winding cores, and the electrode plates and the separators may be wound with respect to the winding cores. Specifically, the first electrode tab 310 provided with the separator 330 may be wound counterclockwise to surround the negative electrode plate 320 provided with the separator 330, and the second electrode plate 320 may also be wound counterclockwise to surround the positive electrode plate 310. By repeatedly doing this, the positive and negative electrode plates 310 and 320 can be opposite each other with the separators 330 interposed therebetween. In this instance, the first and second electrode tabs 340 and 350 face opposite directions so that they are not opposite each other in the electrode plates.

As shown in FIG. 10, the electrode assembly 400 according to this embodiment may be provided so that the cut-away portion provided to the first non-coating portion 312 is not included in a bending portion 460a at the central portion that is a portion at which the winding of the electrode assembly 400 is started. The cut-away portion provided to the second non-coating portion 322 may not also be included in a bending portion 460b. As described above, the cut-away portions may be easily damaged by an external impact or the like. Therefore, the cut-away portions may preferably not be included in the respective bending portions 460a and 460b so that a force is not applied to the cut-away portions.

Referring to FIG. 11, the electrode assembly 400 according to this embodiment and the electrode assembly 300 shown in FIG. 8 may be manufacturing using different winding methods. However, the completed electrode assemblies have the same shape. The other configuration and function of the electrode assembly 400 may be identical to those of the electrode assembly 300 shown in FIGS. 8A and 8B. The method of winding the electrode assembly 400 according to this embodiment is the same as shown in FIG. 5. Therefore, the configuration, function and winding method of the electrode assembly 400 will not be described.

FIGS. 12 to 15 are views of an electrode assembly according to still another embodiment of the present invention.

Figure 12:
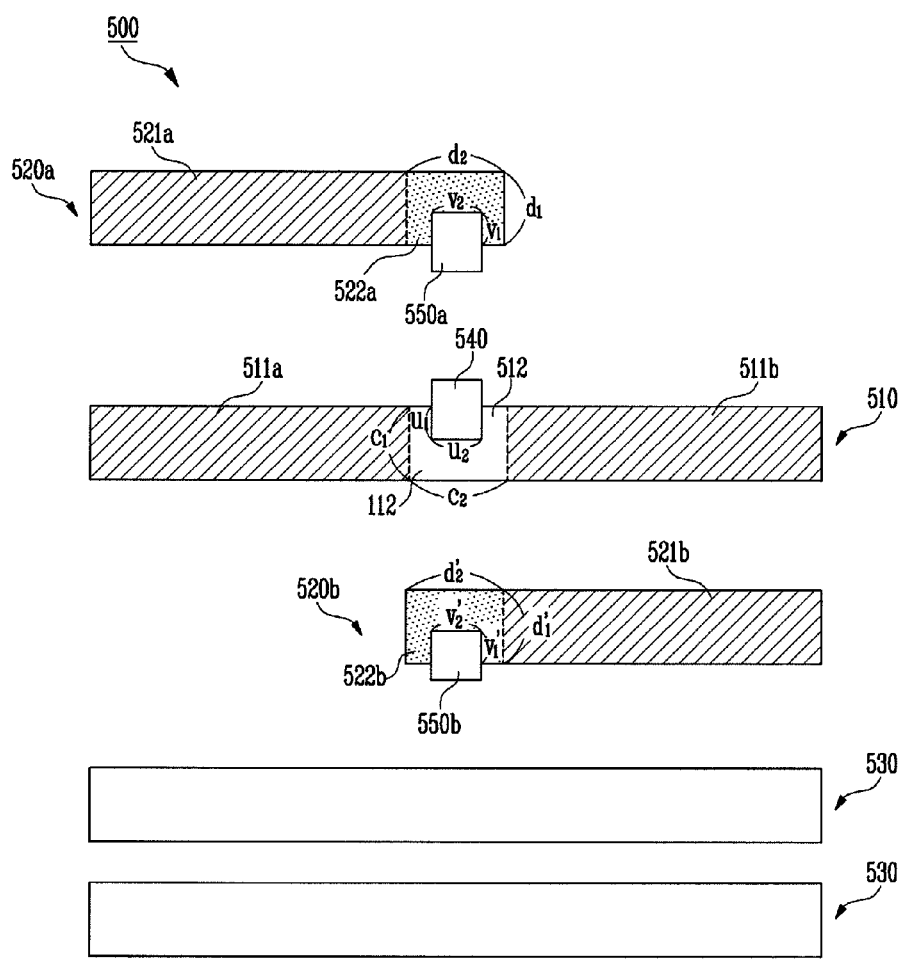
FIG. 12 is an exploded view of an electrode assembly according to still another embodiment of the present invention.
Figure 14:
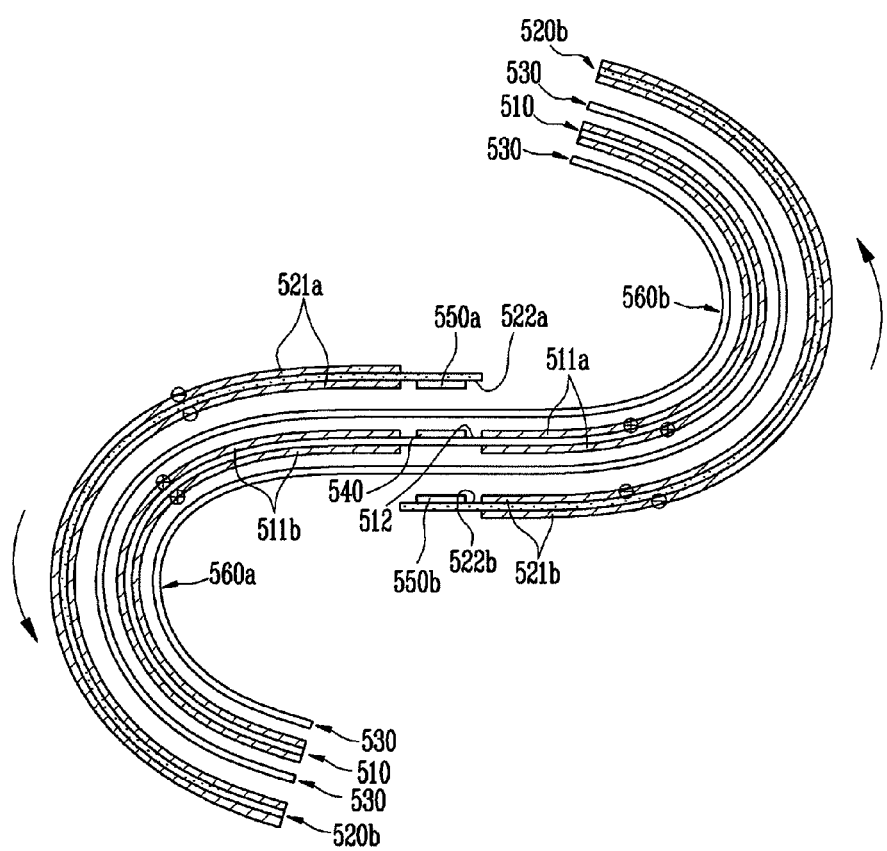
FIG. 14 is a schematic view illustrating a method of winding the electrode assembly shown in FIG. 12.
Figure 15:
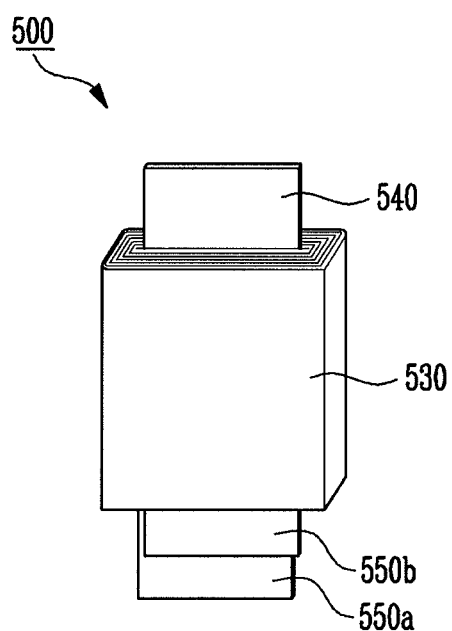
FIG. 15 is a perspective view of the electrode assembly wound according to the method of FIG. 14.

FIG. 12 is an exploded view of an electrode assembly according to another embodiment of the present invention. FIG. 13A is a top view of the electrode assembly shown in FIG. 12. FIG. 13B is a sectional view taken along line Y"-Y" of FIG. 13A. FIG. 14 is a schematic view illustrating a method of winding the electrode assembly shown in FIG. 12. FIG. 15 is a perspective view of the electrode assembly wound according to the method of FIG. 14.

Referring to FIG. 12, the electrode assembly 500 according to this embodiment includes a positive electrode plate 510 including one or more positive electrode active material portions 511a and 511b having a positive electrode active material intermittently coated thereon and a first non-coating portion 512 on which the positive electrode active material is not coated between the positive electrode active material portions 511a and 511b; two negative electrode plates 520a and 520b respectively including negative electrode active material portions 521a and 521b having a negative electrode active material coated thereon and second non-coating portions 522a and 522b on which the negative electrode active material is not coated at one ends of the negative electrode plates 520a and 520b; separators 530 interposed between the positive electrode plate 510 and the negative electrode plates 520a and 520b; and first and second electrode tabs 540, 550a and 550b are respectively provided to the first and second non-coating portions 512, 522a and 522b. The negative electrode plates 520a and 520b may be respectively provided at upper and lower portions of the positive electrode plate 510 so that at least portions of the first and second non-coating portions 512, 522a and 522b are opposite one another and the first and second electrode tabs 540, 550a and 550b are not opposite one another in the electrode plates. In this instance, the negative electrode plates 520a and 520b may not be opposite each other. The electrode assembly 500 may be formed by winding the positive and negative electrode plates 510, 520a and 520b from the portion at which the first and second non-coating portions 512, 522a and 522b are opposite one another.

The first non-coating portion 512 may not be provided to one end of the positive electrode plate 510, but may be provided between the positive electrode active material portions 511a and 511b of the positive electrode plate 510. In this figure, the first positive electrode active material portion 511a may be provided at the left side with respect to the first non-coating portion 512, and the second positive electrode active material portion 511b may be provided at the right side with respect to the first non-coating portion 512.

The first and second positive electrode active material portions 511a and 511b may be coated with the same positive electrode active material, or may be coated with different positive electrode active materials. In a case where the same positive electrode active material is used, the positive electrode active material portions may be varied using various methods including a method of changing the thickness of the positive electrode active material coated on each of the positive electrode active material portions, and the like. Thus, the secondary battery including the electrode assembly 500 is advantageous in that it is possible to more freely change characteristics of its capacity according to the design of the secondary battery. In this embodiment, the electrode assembly 500 is manufactured by coating the first and second positive electrode active material portions 511a and 511b with the same positive electrode active material so as to have the same thickness.

The negative electrode plates 520a and 520b may include a first negative electrode plate 520a and a second negative electrode plate 520b. The first and second electrode plates 520a and 520b may include first and second negative electrode active material portions 521a and 521b and 2'-th and 2"-th non-coating portions 522a and 522b, respectively. The first and second negative electrode active material portions 521a and 521b may be coated with different negative electrode active materials, or may be coated with the same negative electrode active material. In a case where the same negative electrode active material is used, the thicknesses of the negative electrode active material coated on the negative electrode active material portions may be varied. As described above, the first and second negative electrode active material portions 521a and 521b can be properly varied to correspond to the respective positive electrode active material portions 511a and 511b.

In this embodiment, the electrode assembly 500 may be manufactured by coating the same negative electrode active material on the first and second negative electrode active material portions 521a and 521b to correspond to the respective first and second positive electrode active material portions 511a and 511b.

The second electrode tab may include 2'-th and 2"-th electrode tabs 550a and 550b. The 2'-th and 2"-th electrode tabs 550a and 550b may be provided to the first and second negative electrode plates 520a and 520b, respectively. The 2'-th and 2"-th electrode tabs 550a and 550b may be provided so that their widths are the same but their longitudinal lengths are different from each other.

The first electrode tab 540 may be provided at an upper portion of the electrode assembly 500, and the 2'-th and 2"-th electrode tabs 550a and 550b may be provided at a lower portion of the electrode assembly 500. Portions at which the 2'-th and 2"-th electrode tabs 550a and 550b contact the respective non-coating portions may be chamfered.

Referring to FIG. 12, the sizes of the electrode tabs according to this embodiment may be as follows. The longitudinal $u_1$ length of an attachment surface of the first electrode tab 540 attached to the first non-coating portion 512 with respect to the winding direction of the electrode assembly 500 may be determined by the minor-axis length $c_1$ of the first electrode tab 540. The width $u_2$ of the first electrode tab 540 may be determined by the winding width of the electrode assembly 500 according to this embodiment. Similarly, the longitudinal lengths $v_1$ and $v'_1$ of attachment surfaces of the 2'-th and 2"-th electrode tabs 550a and 550b attached to the 2'-th and 2"-th non-coating portions 522a and 522b may be determined by the minor-axis lengths $d_1$ and $d'_1$ of the first and second negative electrode plates 520a and 520b, respectively. The widths $v_2$ and $v'_2$ of the 2'-th and 2"-th electrode tabs 550a and 550b may be determined by the winding width of the electrode assembly 500 according to this embodiment.

The sizes of the first electrode tab 540 and the 2'-th and 2"-th electrode tabs 550a and 550b and the sizes of the attachment surfaces of the electrode tabs attached to the non-coating portions may be variously changed according to the design of the secondary battery. However, the sizes are the same in the illustrated embodiment.

As described above, in a case where the longitudinal lengths $u_1$, $v_1$ and $v'_1$ of the attachment surfaces of the electrode tabs are less than about 5 mm, the attachment area of the electrode tabs to the non-coating portions can be narrow, and therefore, the attachment ability of the electrode tabs may deteriorate. In a case where the longitudinal lengths $u_1$, $v_1$ and $v'_1$ of the attachment surfaces of the electrode tabs are more than about half of the minor-axis lengths of the respective electrode plates, the electrode tabs may be opposite to one another. Therefore, the thickness of the electrode assembly 500 may increase, and the electrode assembly 500 can be easily deformed in the winding of the electrode assembly 500. Accordingly, the longitudinal length $u_1$ of the attachment surface of the first electrode tab 540 and the longitudinal lengths $v_1$ and $v'_1$ of the attachment surfaces of the 2'-th and 2"-th electrode tabs 550a and 550b are preferably within the range of about 5 mm or longer to less than about half of the minor-axis length $c_1$ of the positive electrode plate 510.

The widths $u_2$, $v_2$ and $v'_2$ of the electrode tabs with respect to the winding direction of the electrode assembly 500 are preferably identical to the minimum winding width of the electrode assembly 500. In a case where the widths $u_2$, $v_2$ and $v'_2$ of the electrode tabs are different, the winding width of the electrode assembly 500 may be determined by the electrode tab having the wider width than the other electrode tabs. Therefore, since only the electrode tab having the wider width can serve as a winding core, a force may be biased to one direction in the winding of the electrode assembly 500. Accordingly, the widths $u_2$, $v_2$ and $v'_2$ of the electrode tabs are preferably identical to one another.

As described above, the 2'-th and 2"-th electrode tabs 550a and 550b can have the same width, but may have different longitudinal lengths. In the 2'-th and 2"-th electrode tabs 550a and 550b, the 2'-th electrode tab 550a having a longitudinal length relatively longer than the 2"-th electrode tabs 550b may be provided to have the same longitudinal length as the first electrode tab 540. On the other hand, the end of a portion protruded to the outside of the 2"-th electrode tab 550b having a longitudinal length relatively shorter than the 2'-th electrode tabs 550a can contact the 2'-th electrode tab 550a. The portion at which the 2'-th and 2"-th electrode tabs 550a and 550b contact each other may be welded using a resistance welding or laser welding. In this embodiment, the longitudinal lengths of the 2'-th and 2"-th electrode tabs 550a and 550b may be different from each other, but the longitudinal lengths may be identical to each other.

Referring to FIG. 13, the non-coating portions of the electrode plates may be opposite to one another with the separators 530 interposed therebetween at a central portion of the electrode assembly 500. In this instance, the electrode tabs may be stacked so that at the side of the non-coating portions, the 2'-th and 2"-th electrode tabs 550a and 550b may be opposite to each other on the same side of the electrode assembly, but the first electrode tab 540 and the 2'-th and 2"-th electrode tabs 550a and 550b are not opposite to each other on the same side of the electrode assembly. Accordingly, the first electrode tab 540 and the 2'-th and 2"-th electrode tabs 550a and 550b may be provided at the upper and lower portions of the electrode assembly 500 in directions opposite to each other. In this instance, the 2'-th and 2"-th electrode tabs 550a and 550b may be protruded in the same direction.

Hereinafter, a method of winding the electrode assembly 500 according to this embodiment will be described with reference to FIGS. 14 and 15.

Referring to FIG. 14, the electrode assembly 500 according to this embodiment includes one positive electrode plate 510 and two first and second negative electrode plates 520a and 520b and two separators 530. The positive electrode plate 510 may be provided with the first non-coating portion 512 formed at any one end thereof and in an inside portion thereof. The first positive electrode active material portion 511a may be formed at the left side of the first non-coating portion 512, and the second positive electrode active material portion 511b may be formed at the right side of the first non-coating portion 512.

The first negative electrode plate 520a may be provided on a left upper surface of the positive electrode plate 510, and the separator 530 may be interposed between the positive electrode plate 510 and the first negative electrode plate 520a. The second negative electrode plate 520b may also be provided on a right lower surface of the positive electrode plate 510 in the state that the separator 530 may be interposed between the positive electrode plate 510 and the second negative electrode plate 520b. Thus, the first and second negative electrode active material portions 521a and 521b may be stacked corresponding to the respective first and second positive electrode active material portions 511a and 511b.

The non-coating portions of first and second negative electrode plates 520a and 520b may be opposite to the front and rear surfaces of the non-coating portion of the positive electrode plate 510, respectively. Here, the 2'-th electrode tab 550a may be opposite to one surface of the non-coating portion of the positive electrode plate 510, and the 2"-th electrode tab 550b may be opposite to the other surface of the non-coating portion of the positive electrode plate 510. Thus, the 2'-th and 2"-th electrode tabs 550a and 550b may be opposite to each other with the first electrode tab 540 interposed therebetween.

Accordingly, the first positive electrode active material portion 511a of the positive electrode plate 510 may be opposite to the first negative electrode active material portion 521a of the first negative electrode plate 520a with the separator 530 interposed therebetween. The second positive electrode active material portion 511b of the positive electrode plate 510 may also be opposite to the second negative electrode active material portion 521b of the second negative electrode plate 520b. As described above, the electrode assembly 500 may be provided so that the electrode plates having different polarities are opposite each other. In the electrode assembly, the active material portions of each of the electrode plates may be opposite each other, and the non-coating portions of each of the electrode plates may be opposite each other.

In the electrode assembly 500, as shown in FIG. 14, the first positive electrode active material portion 521a of the positive electrode plate 510 and the first negative electrode plate 520 provided opposite to the first positive electrode active material portion 521a may be wound so as to surround the second positive electrode active material portion 521b of the positive electrode plate 510 and the second negative electrode plate 520b provided opposite to the second positive electrode active material portion 521b.

That is, the first negative electrode plate 520a, the separators 530 and the left side of the positive electrode plate 510 may be wound counterclockwise to surround the second negative electrode plate 520b. The separators 530, the right side of the positive electrode plate 510 and the second negative electrode plate 520b may be wound counterclockwise to surround the first negative electrode plate 520a. In this instance, the electrode tabs provided at the central portion of the electrode assembly 500 may serve as winding cores so as to facilitate the winding of the electrode assembly 500. By repeatedly doing this, the electrode assembly 500 according to this embodiment can be manufactured. It will be appreciated that any of the aforementioned embodiments of electrode assemblies can be accommodated in a suitable case, such as the case 20 shown in FIG. 1.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode assembly comprising:
    a first electrode plate comprising a first active material portion on which a first active material is coated and a first non-coating portion that has two edges on which the first active material is not coated between the two edges of the non-coating portion;
    a second electrode plate comprising a second active material portion on which a second active material is coated and a second non-coating portion that has two edges on which the second active material is not coated between the two edges of the non-coating portion;
    a separator interposed between the first and second electrode plates wherein the first and second electrode plates are positioned so that the first edge of the first electrode plate is positioned adjacent the first edge of the second electrode plate and the second edge of the first electrode plate is positioned adjacent the second edge of the second electrode plate; and
    first and second electrode tabs respectively coupled to the first and second non-coating portions so that the first electrode tab extends outward from the first edge of the first non-coating portion of the first electrode plate in a first direction and so that the second electrode tab extends outward from the second edge of the second non-coating portion of the second electrode plate in a second direction that is opposite the first direction, and wherein a portion of the first and second electrode tabs at which the first or second electrode tab contacts the first or second non-coating portion is chamfered,
    wherein portions of the first and second non-coating portions are opposite to each other and overlap each other, the chamfered portions of the first and second electrode tabs being positioned adjacent each other and contoured so that the combined thickness of the overlapped non-coating portions having the coupled first and second electrode tabs is substantially the same from the first edge to the second edge, and the electrode assembly is formed by winding the first and second electrode plates from the portion at which the first and second non-coating portions face each other and wherein the first and second electrode tabs are arranged so that the thicknesses of the first electrode tab on the first electrode plate and the second electrode tab on the second electrode plate are substantially equal to each other between the first and second edges of the first and second electrode tabs.

2. The electrode assembly according to claim 1, wherein the first and second electrode tabs are coupled to upper and lower portions of the electrode assembly, respectively.

3. The electrode assembly according to claim 1, wherein the first or second electrode tab has a width equal to a minimum winding width of the electrode assembly.

4. The electrode assembly according to claim 1, wherein the first or second electrode tab overlaps the first or second plates or the first or second non-coating portion, respectively, and the length at which the first or second electrode tab overlap the first or second non-coating portion is within the range of about 5 mm to less than about half of the length of the first or second electrode plate, respectively.

5. The electrode assembly according to claim 1, wherein the first or second non-coating portion comprises a cut-away portion formed at a portion of the first or second non-coating portion not coupled to the first or second electrode tab, respectively.

6. The electrode assembly according to claim 5, wherein the cut-away portion has a length that is less than about half of the length of the first or second electrode plates.

7. The electrode assembly according to claim 5, wherein a corner of the cut-away portion is chamfered.

8. The electrode assembly according to claim 5, wherein the cut-away portion is not included in a bending portion of the electrode assembly to be wound.

9. The electrode assembly according to claim 1, wherein portions of the first and second non-coating portions at a first end of the first and second electrode plates are opposite to each other, and a second end of the electrode plates face opposite directions.

10. The electrode assembly according to claim 1, wherein the first electrode plate comprises one or more first active material portions on which the first active material is intermittently coated with a first non-coating portion provided between the first active material portions, and the first electrode tab is coupled to the first non-coating portion.

11. The electrode assembly according to claim 1, wherein portions of the first and second non-coating portions are at a first end of the first and second electrode plates, respectively, and are opposite to each other at a winding central portion of the electrode assembly, wherein a second end of the first and second electrode plates face the opposite directions, and wherein the first and second electrode plates are wound in the same directions with respect to the winding central portion.

12. The electrode assembly according to claim 1, wherein a first end of the first and second electrode plates are provided at the winding central portion and a second end of the first and second electrode plates face the same direction, and the first and second electrode plates are wound in the same direction with respect to the winding central portion.

13. A secondary battery comprising the electrode assembly according to claim 1 and a case accommodating the electrode assembly therein.

* * * * *